(12) United States Patent
Francese et al.

(10) Patent No.: US 8,929,428 B2
(45) Date of Patent: Jan. 6, 2015

(54) FEED-FORWARD EQUALIZATION IN A RECEIVER

(71) Applicant: International Business Machines Corporation, Armonk, NY (US)

(72) Inventors: Pier Andrea Francese, Zurich (CH); Thomas Toifl, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 13/663,768

(22) Filed: Oct. 30, 2012

(65) Prior Publication Data

US 2014/0119424 A1 May 1, 2014

(51) Int. Cl.
  *H03H 7/30* (2006.01)
(52) U.S. Cl.
  USPC .......................................... 375/232; 375/231
(58) Field of Classification Search
  CPC .............. H04L 25/0272; H04L 25/03012; H04L 25/03878; H04L 27/01; H04L 2025/03471; H04L 2025/03509
  USPC .................................................. 375/229–234
  See application file for complete search history.

(56) References Cited

U.S. PATENT DOCUMENTS

| 7,817,714 | B2 * | 10/2010 | Bae et al. | 375/233 |
| 8,537,886 | B1 * | 9/2013 | Su et al. | 375/233 |
| 2005/0123068 | A1 * | 6/2005 | Liu et al. | 375/316 |
| 2006/0049845 | A1 * | 3/2006 | Jaussi et al. | 326/38 |
| 2006/0067396 | A1 * | 3/2006 | Christensen | 375/232 |
| 2008/0298520 | A1 * | 12/2008 | Hsu et al. | 375/345 |
| 2010/0202506 | A1 * | 8/2010 | Bulzacchelli et al. | 375/233 |
| 2011/0096825 | A1 * | 4/2011 | Hollis | 375/233 |

OTHER PUBLICATIONS

Balamurugan, G., et al.; "Modeling and Analysis of High-Speed I/O Links"; IEEE Transaction on Advanced Packaging; vol. 32, Issue 2; p. 237-247; 2009.
Beukema, T., et al.; "A 6.4-Gb/s CMOS SerDes Core With Feed-Forward and Decision-Feedback Equalization"; IEEE Journal of Solid-State Circuits; vol. 40; p. 2633-2645; 2005.
Guilar, N. J., et al.; "A Passive Switched-Capacitor Finite-Impulse-Response Equalizer"; IEEE J. Solid-State Circuits; vol. 42; p. 400-409; 2007.
Kelly, N.P., et al.; "A Mixed-Signal DFE/FFE Receiver for 100Base—TX Applications"; IEEE Solid-State Circuits Conference, ISSCC; p. 310-311; 2000.
Liu, J. J., et al.; "Equalization in High-Speed Communication Systems"; IEEE Circuits and Systems Magazine; vol. 4, Issue 2; p. 4-17; 2004.
Stojanovic, V., et al.; "Modeling and Analysis of High-Speed Links"; IEEE Custom Integrated Circuits Conference; p. 589-594; 2003.
Sugita, H., et al.; A 16Gb/s 1st-Tap FFE and 3-Tap DFE in 90nm CMOS; IEEE Solid-State Circuit Conference, ISSCC, p. 162-164; 2010.

* cited by examiner

*Primary Examiner* — David B. Lugo
(74) *Attorney, Agent, or Firm* — Cantor Colburn LLP; Daniel Morris (57) ABSTRACT

Embodiments are directed to feed-forward equalization. In some embodiments, a first circuit is configured to receive a signal transmitted over a channel as a differential pair, and a second circuit is configured to mirror the signal as at least a pre-cursor component comprising a first transistor of a first type of technology, a cursor component comprising a second transistor of a second type of technology, and a post-cursor component comprising a third transistor of the first type of technology.

17 Claims, 9 Drawing Sheets

FIG. 1

PRIOR ART

FEED-FORWARD EQUALIZATION IN A RECEIVER

BACKGROUND

The present disclosure relates generally to a transmission and reception of signals, and more specifically to mitigating inter-symbol interference (ISI) in low power, high speed data rate environments.

Equalization techniques may be used in connection with a transmission or reception of signals. For example, in connection with a channel (e.g., a copper transmission line) linking integrated circuits and memories on a printed circuit board (PCB), dielectric losses and impedance mismatches associated with the channel may cause signal attenuation and dispersion, which may result in undesirable inter-symbol interference (ISI).

Figure 1:
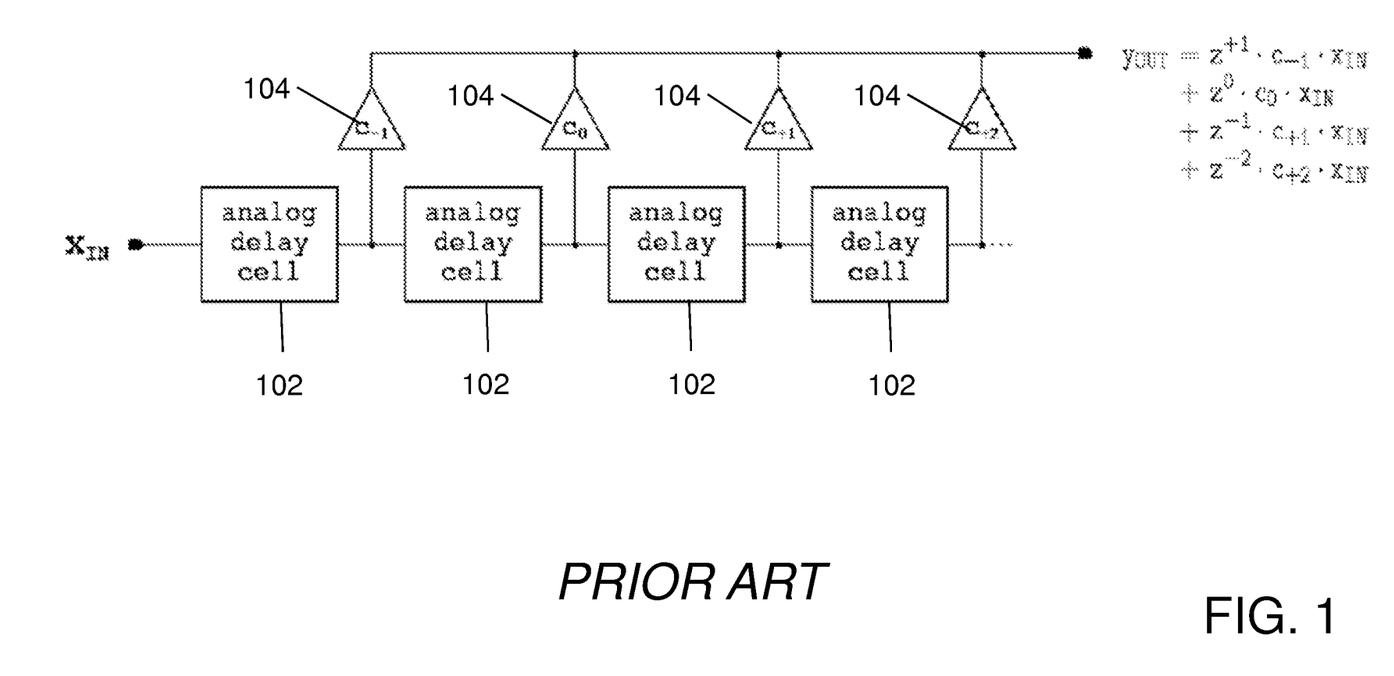
FIG. 1 depicts an architecture in accordance with the prior art.

To combat ISI in designs, such as low-power high-speed I/O link designs, feed-forward equalization (FFE) may be implemented in connection with a transmitter. Implementation of an FFE in the transmitter has the benefit of working with a known data sequence with samples that are available in a digital format. Implementing an FFE in a receiver may be more difficult since such an implementation requires, with respect to an input or received signal $x_{in}$, the use of one or more analog delay cells 102, where the outputs of the analog delay cells 102 may be weighted via weights 104 and summed to generate an output $y_{out}$ as shown in FIG. 1. Implementation of an FFE in the receiver, however, may provide a benefit of immunity with respect to timing jitter amplification in the channel. As data rates increase and lower-power technologies are utilized, the effects of the channel become increasingly pronounced on the quality of the received signal.

SUMMARY

An embodiment is directed to a feed-forward equalization system comprising: a first circuit configured to receive a signal transmitted over a channel as a differential pair, and a second circuit configured to mirror the signal as at least a pre-cursor component comprising a first transistor of a first type of technology, a cursor component comprising a second transistor of a second type of technology, and a post-cursor component comprising a third transistor of the first type of technology.

An embodiment is directed to a method for implementing a feed-forward equalization system for a receiver, comprising: applying at least one of a training sequence and a calibration technique to a pre-cursor component and a post-cursor component, selecting values for control signals associated with the pre-cursor component and the post-cursor component based on the at least one of a training sequence and a calibration technique, receiving, at the receiver, a signal over a channel, and generating a plurality of output current signals based on the received signal and the control signals, wherein each of the plurality of output current signals comprises a summation of a first current associated with the pre-cursor component, a second current associated with a cursor component, and a third current associated with the post-cursor component.

An embodiment is directed to an apparatus comprising: a first circuit configured to receive a pair of differential voltage signals and convert the differential voltage signals into a pair of differential current signals, a second circuit configured to be biased based on the differential current signals, and a third circuit configured to sample and hold a voltage associated with the second circuit to convey a weighted copy of the differential current signals to transistor outputs that implement a pre-cursor component, a cursor component, and a post-cursor component.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments of the disclosure may include a feed-forward equalizer (FFE). The FFE may be implemented in a receiver that is associated with a transmitter and a communication channel. The FFE may be constructed or implemented using switched-current techniques. In some embodiments, the FFE may be constructed using one or more taps. The FFE may be implemented in connection with a "fractional-rate" input/output (I/O) link architecture. For example, half-rate and quarter-rate I/O link architectures may be used in some embodiments.

Figure 2:
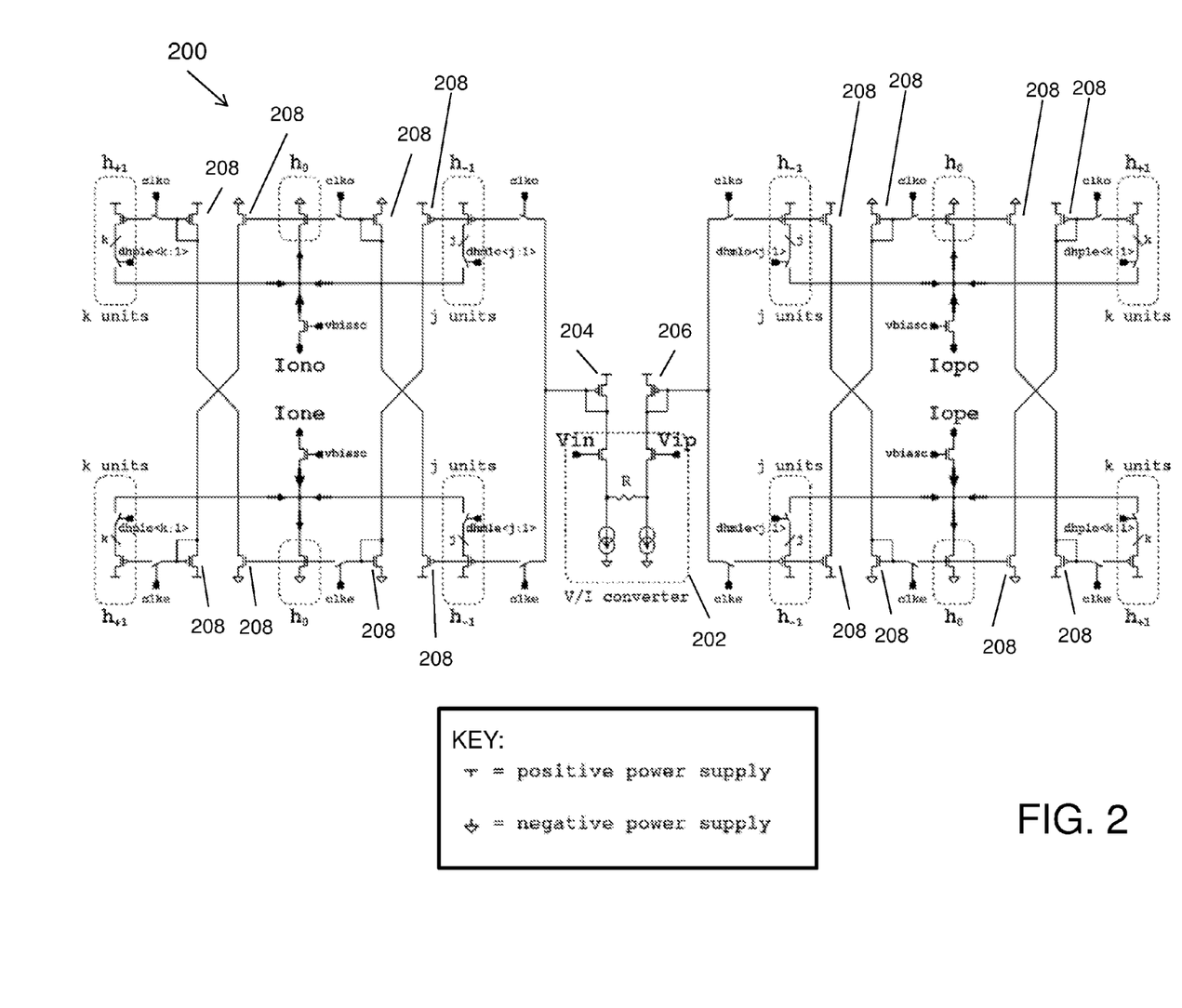
FIG. 2 depicts an exemplary feed-forward equalization system architecture in accordance with one or more embodiments.

FIG. 2 illustrates a schematic of an exemplary FFE architecture 200 in accordance with one or more embodiments. The architecture 200 may be used to implement a half-rate I/O link receiver.

A signal that is received may be associated with a differential pair of voltage signals, indicated in FIG. 2 as $V_{in}$ and $V_{ip}$. The voltage signals $V_{in}$ and $V_{ip}$ may be converted into two differential currents $I_{in}$ and $I_{ip}$ (shown, for example, in FIG. 5) by a voltage-to-current (V/I) converter circuit 202. The differential currents $I_{in}$ and $I_{ip}$ from the circuit 202 may bias two transistors (e.g., two diode-connected metal oxide semiconductor (MOS) transistors) 204 and 206.

A gate-to-source voltage ($V_{GS}$) on the transistors 204 and 206 may be sampled and held as described further below. This sampled gate-to-source voltage ($V_{GS}$) may be used to mirror and convey weighted copies of the input currents $I_{in}$ and $I_{ip}$ from the circuit 202 to transistor (e.g., MOS transistor) outputs denoted as $h_{-1}$, $h_0$, and $h_{+1}$ in FIG. 2. The $h_{-1}$ output may be used to implement the so-called first pre-cursor component, the $h_0$ output may be used to implement the so-called cursor component, and the $h_{+1}$ output may be used to implement the so-called first post-cursor component. While not shown in FIG. 2, in some embodiments additional orders (e.g., higher orders) of pre-cursor and post-cursor components may be used.

Figure 3:
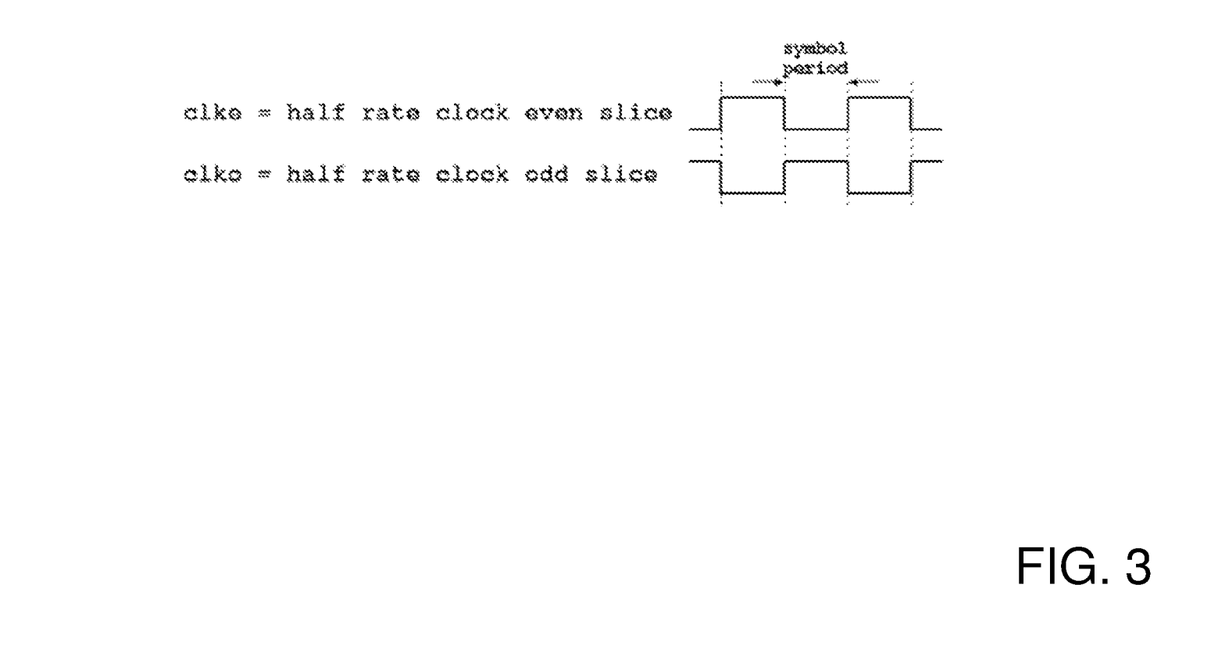
FIG. 3 depicts exemplary clock signals in accordance with one or more embodiments.

As described above, the architecture 200 may be used to implement a half-rate I/O link receiver. A first or even half/slice may be implemented via a first clock signal, referred to as clke in FIG. 3. A second or odd half/slice may be implemented via a second clock signal, referred to as clko in FIG. 3. As shown in FIG. 3, the clocks clke and clko may have the same period or frequency and duty cycle (e.g., half duty cycle), but might be shifted from one another by half a cycle or 180 degrees. The frequency associated with the clocks clke and clko may serve to set a sample rate.

The clocks clke and clko may be applied to the respective nodes shown in FIG. 2 in order to sample the gate-to-source voltage ($V_{GS}$) on the transistors 204 and 206. The sampled voltage may be held by one or more transistors, such as transistors 208.

As shown in FIG. 2, the pre-cursor component $h_{-1}$ may be associated with a number of components, generally referred to herein as 'j' units, where 'j' may correspond to a number such as 8 or 16. The j units may be implemented as transistors (e.g., power MOSFETs, TMOS transistors, etc.) that may be controlled by one or more control signals (e.g., static signals). Similarly, the post-cursor component $h_{+1}$ may be associated with a number of components, generally referred to herein as 'k' units, where 'k' may correspond to a number such as 8 or 16. The k units may be implemented as transistors (e.g., power MOSFETs, TMOS transistors, etc.) that may be controlled by one or more control signals (e.g., static signals). The j and k units may be used as weights to mitigate or compensate for the effects (e.g., attenuation, dispersion) of the communication channel between a transmitter and a receiver. The values or coefficients for the weights provided by the j and k units may be determined via an application of training sequences or calibration techniques.

The transistors 208 associated with the cursor component $h_0$ may be implemented as an n-channel or NMOS transistor. The transistors 208 associated with the pre-cursor component $h_{-1}$ and the post-cursor component $h_{+1}$ may be implemented as one or more p-channel or PMOS transistors.

As shown in FIG. 2, in some embodiments the cursor component $h_0$ may be implemented as a single component (e.g., a single transistor), and might not be associated with a plurality of components like the j and k units described above with respect to $h_{-1}$ and $h_{+1}$. The cursor component $h_0$ may be treated as a reference relative to the other components (e.g., $h_{-1}$ and $h_{+1}$) and the received signal may correspond to a maximum with respect to the cursor component $h_0$.

The outputs of the architecture 200 may correspond to two differential pairs of sampled currents, a first or even sampled pair (denoted as $I_{ope}$, $I_{one}$ in FIG. 2) and a second or odd sampled pair (denoted as $I_{opo}$, $I_{ono}$ in FIG. 2). Additional detail regarding these sampled currents is provided below.

Figure 4:
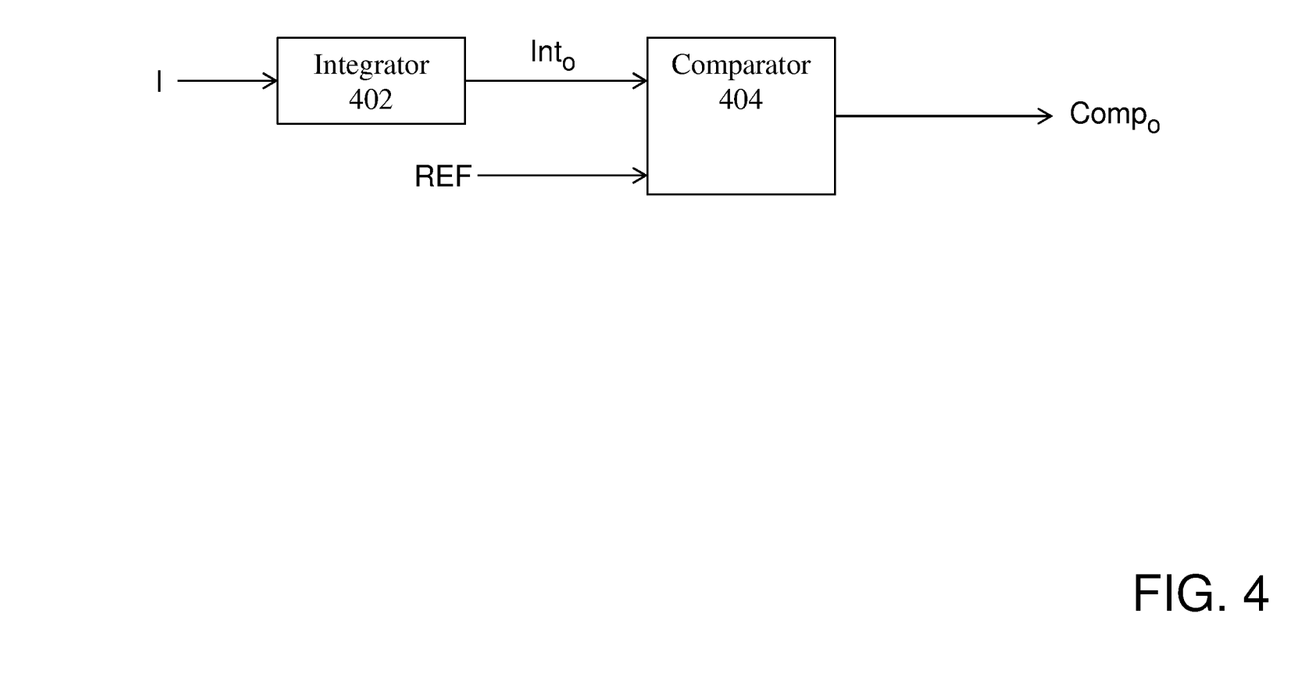
FIG. 4 depicts a block diagram of an exemplary circuit in accordance with one or more embodiments.

As shown in FIG. 4, in some embodiments one or more currents I, such as the currents $I_{ope}$, $I_{one}$, $I_{opo}$, $I_{ono}$, may be provided as an input to an integrator 402. In some embodiments, the integrator 402 may be, or include, a capacitor. The output of the integrator, $Int_o$, may be provided as an input to a comparator 404. The comparator 404 may also receive an input, REF, which may serve as a reference value. The comparator 404 may be configured to compare the output of the integrator $Int_o$ and the reference REF, and may generate an output signal $Comp_o$ based on the comparison. $Comp_o$ may represent a value indicative of the received signal (e.g., a digital/binary '0' or a digital/binary '1'). The integrator 402 may be reset between cycles or sample periods in order to facilitate the reuse of the circuit of FIG. 4 for multiple cycles. In some embodiments, multiple instances of the circuit of FIG. 4 may be used to support an integration-and-comparison of multiple signals concurrently or simultaneously.

A resistor R of the circuit 202 of FIG. 2 may be a variable resistor. In this respect, the circuit 202 may provide for a variable gain amplifier based on the value of the variable resistor R, which may be used to obtain a sufficient noise margin with respect to the comparator 404 of FIG. 4.

Figure 5:
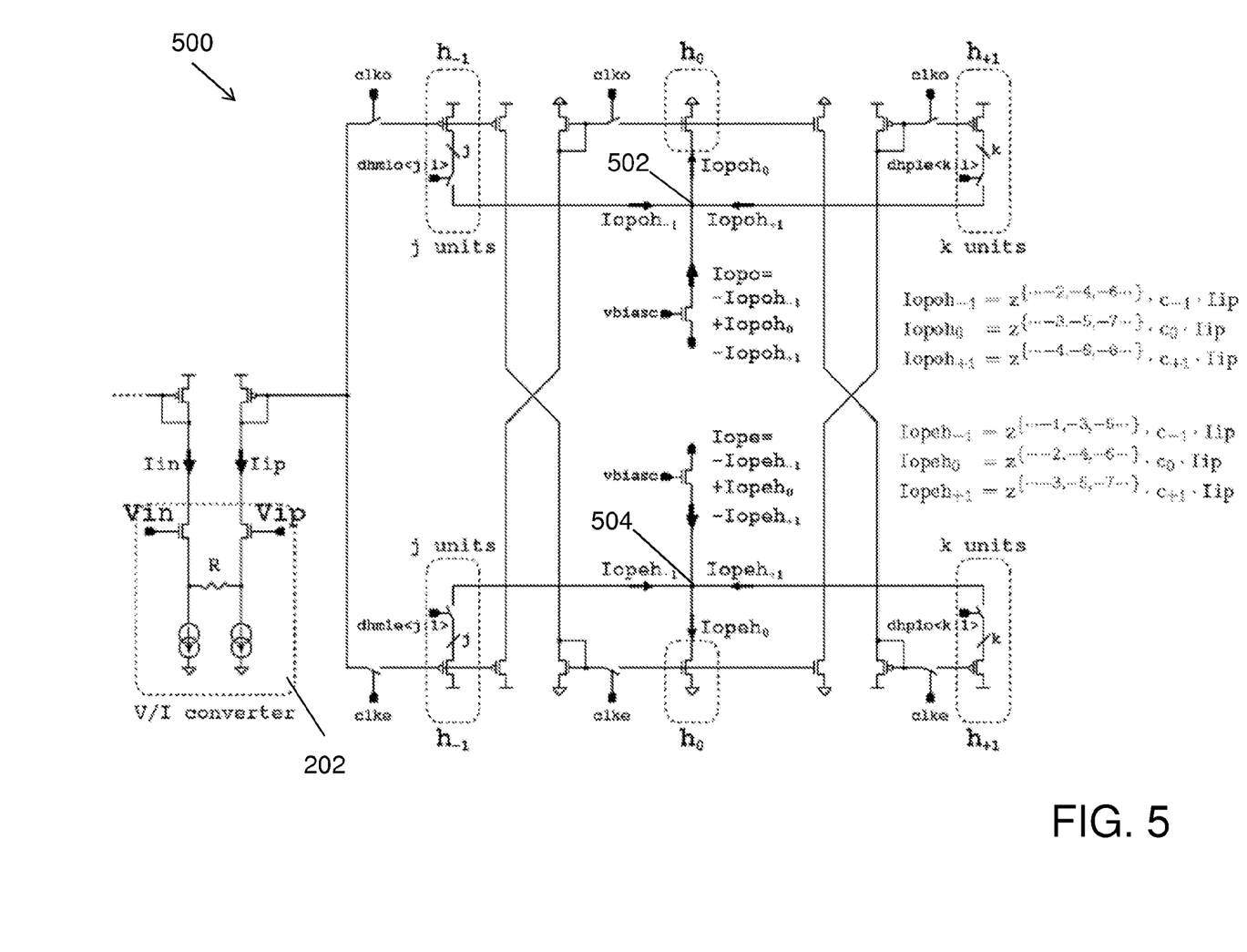
FIG. 5 depicts a portion of an exemplary feed-forward equalization system architecture in accordance with one or more embodiments.

Turning now to FIG. 5, a portion 500 of the architecture 200 of FIG. 2 is shown. Specifically, the portion 500 illustrates the precursor $h_{-1}$, the cursor $h_0$, and the post-cursor $h_{+1}$ components for the positive even and odd branches of the half-rate FFE of FIG. 2. Relative to FIG. 2, a number of labels have been omitted for the sake of clarity and ease of illustration.

As shown in FIG. 5, the current $I_{opo}$ may be expressed as a summation of the currents $I_{opoh}^{-1}$, $I_{opoh}^0$, and $I_{opoh}^{+1}$ at the node 502. Given the reference directions for the currents $I_{opoh}^{-1}$, $I_{opoh}^0$, and $I_{opoh}^{+1}$ shown in FIG. 5, the current $I_{opo}$ may be expressed as:

$$I_{opo} = -(I_{opoh}^{-1}) + (I_{opoh}^0) - (I_{opoh}^{+1}), \text{ where}$$

$$I_{opoh}^{-1} = z^{\{\ldots -2,-4,-6 \ldots\}} * c_{-1} * I_{ip},$$

$$I_{opoh}^0 = z^{\{\ldots -3,-5,-7 \ldots\}} * c_0 * I_{ip}, \text{ and}$$

$$I_{opoh}^{+1} = z^{\{\ldots -4,-6,-8 \ldots\}} * c_{+1} * I_{ip}.$$

As shown in FIG. 5, the current $T_{ope}$ may be expressed as a summation of the currents $I_{opeh}^{-1}$, $I_{opeh}^0$, and $I_{opeh}^{+1}$ at the node 504. Given the reference directions for the currents $I_{opeh}^{-1}$, $I_{opeh}^0$, and $I_{opeh}^{+1}$ shown in FIG. 5, the current $I_{ope}$ may be expressed as:

$$I_{ope} = -(I_{opeh}^{-1}) + (I_{opeh}^0) - (I_{opeh}^{+1}), \text{ where}$$

$$I_{opeh}^{-1} = z^{\{\ldots -1,-3,-5 \ldots\}} * c_{-1} * I_{ip},$$

$$I_{opeh}^0 = z^{\{\ldots -2,-4,-6 \ldots\}} * c_0 * I_{ip}, \text{ and}$$

$$I_{opoh}^{+1} = z^{\{\ldots -1,-3,-5 \ldots\}} * c_{+1} * I_{ip}.$$

One skilled in the art may appreciate that equations for the currents $I_{one}$ and $I_{ono}$ in the negative even and odd branches of the architecture 200 (e.g., to the left of the circuit 202 in FIG. 2) may be written in a manner similar to the equations for the positive even and odd branches described above with respect to FIG. 5.

Figure 6:
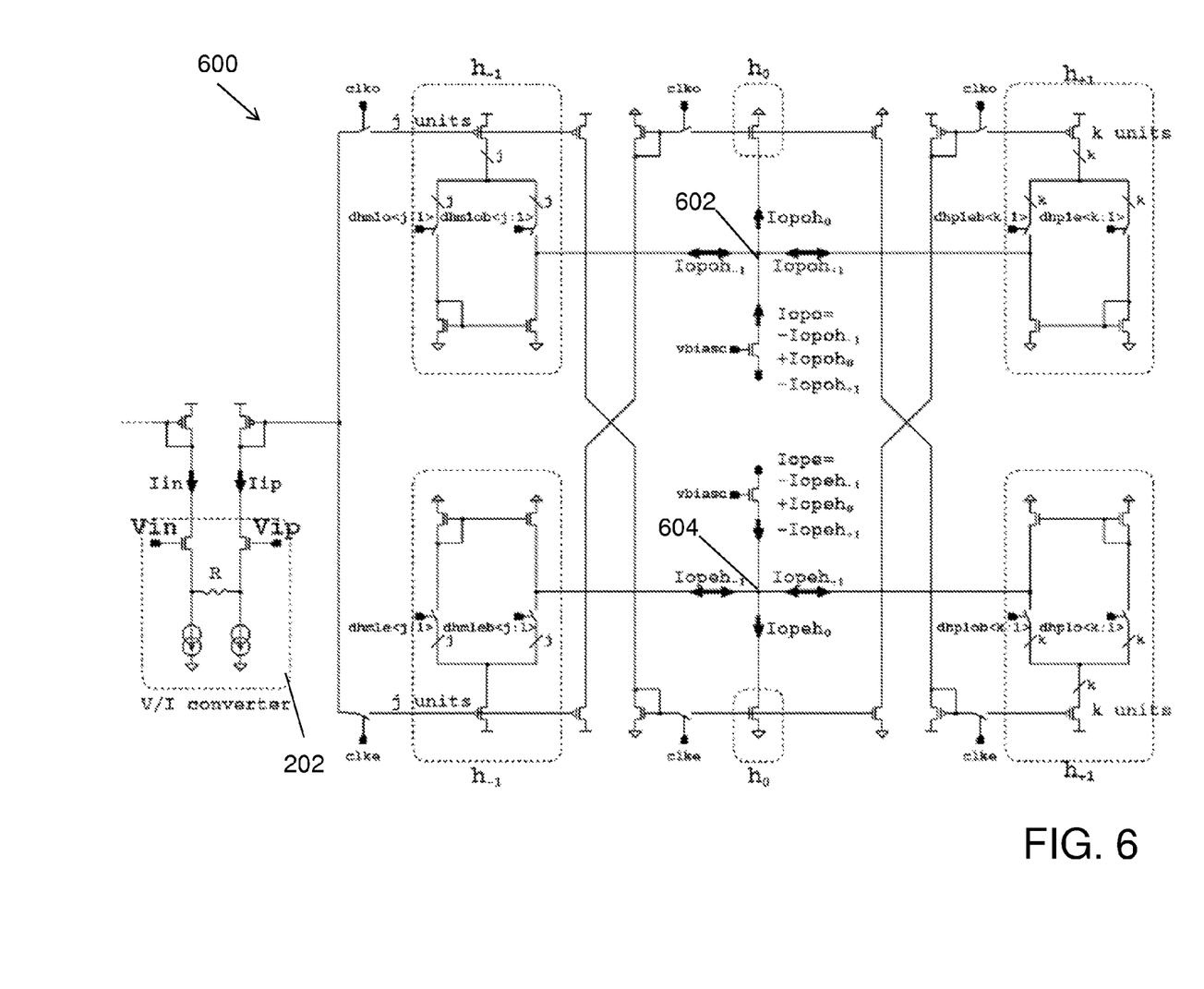
FIG. 6 depicts a portion of an exemplary feed-forward equalization system architecture in accordance with one or more embodiments.

Turning now to FIG. 6, a portion 600 of an FFE architecture is shown. The portion 600 may generally correspond to the portion 500 of FIG. 5. The nodes 602 and 604 may be analogous to the nodes 502 and 504, respectively.

The portion 600 demonstrates that the j and k units may be configured to sink or source current with respect to the nodes 602 and 604. Thus, relative to FIG. 5, the currents $I_{opoh}^{-1}$ and $I_{opoh}^{+1}$ are shown with dual arrow heads in FIG. 6 to reflect that those currents may be configured to sink current into, or source current from, the node 602. Similarly, the currents $I_{opeh}{-1}$ and $I_{opeh}{+1}$ are shown with dual arrow heads in FIG. 6 to reflect that those currents may be configured to sink current into, or source current from, the node 604.

While FIG. 6 shows a portion 600 of an FFE architecture corresponding to positive even and odd branches, it would be understood by one skilled in the art that a similar configuration for the j and k units with respect to the negative even and odd branches could be provided.

Figure 7:
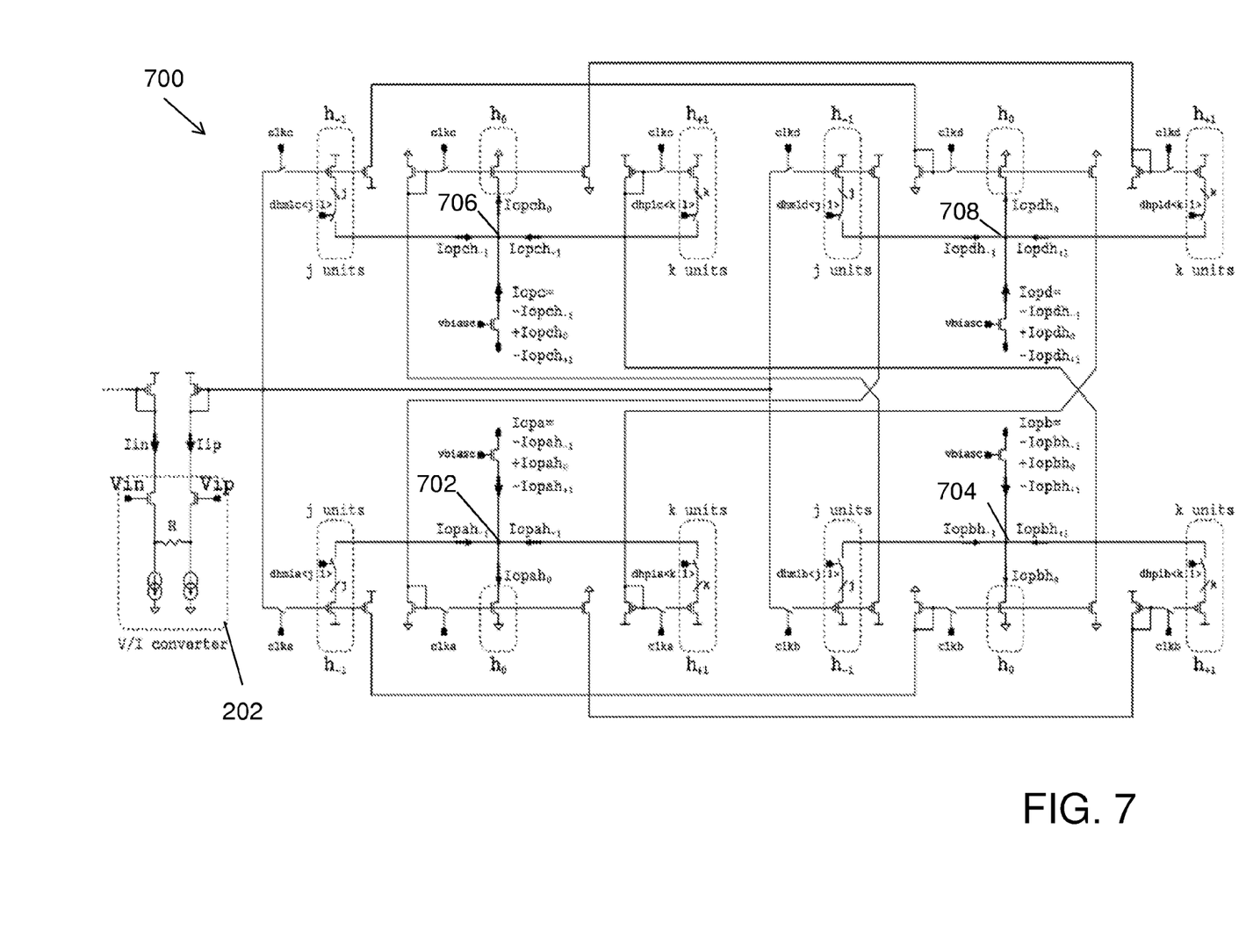
FIG. 7 depicts an exemplary feed-forward equalization system architecture in accordance with one or more embodiments.
Figure 8:
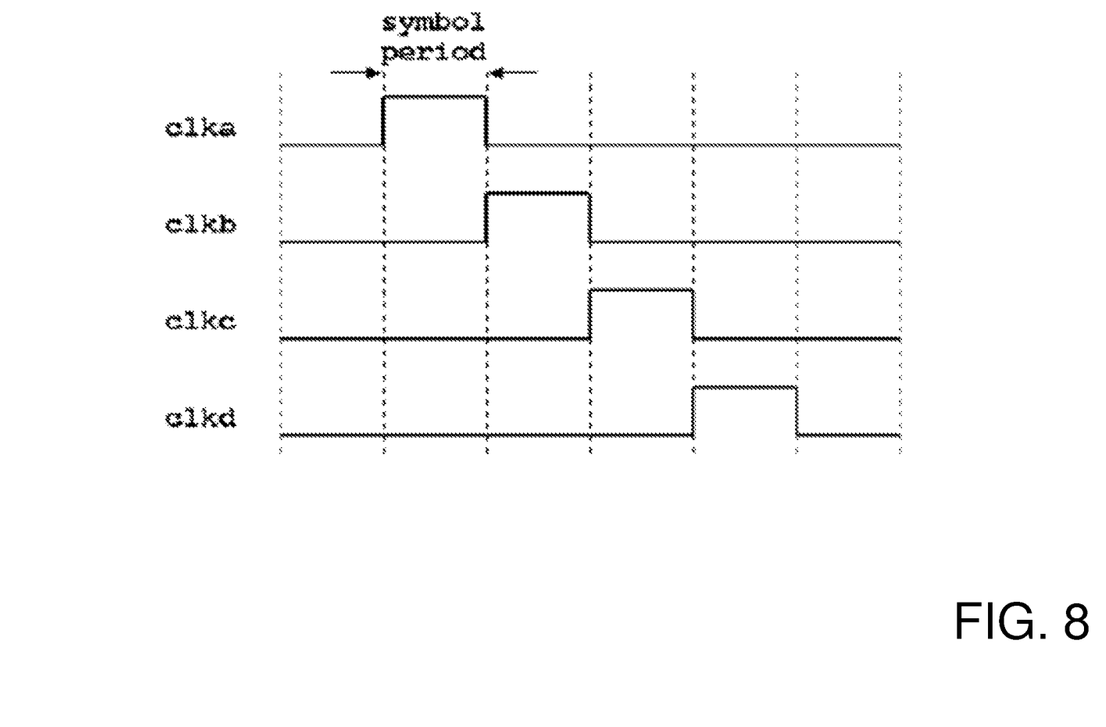
FIG. 8 depicts exemplary clock signals in accordance with one or more embodiments.

Turning now to FIG. 7, a portion 700 of an FFE architecture corresponding to positive even and odd branches of the architecture is shown. The FFE architecture associated with FIG. 7 may be a quarter-rate FEE architecture. In this respect, four clock signals, labeled clka, clkb, clkc, and clkd may be used to effectuate the sampling. An example of the clock signals clka, clkb, clkc, and clkd is shown in FIG. 8.

Relative to the exemplary half-rate FFE architectures described herein, the quarter-rate version may use twice as many switched current cells. The output currents in the quarter-rate version may be held constant for three symbol periods, which may be beneficial when an integrator (e.g., the integrator 402 of FIG. 4) follows the FFE.

The output currents associated with the portion 700 may correspond to $I_{opa}$, $I_{opb}$, $I_{opc}$, and $I_{opd}$. The current $I_{opa}$ may be expressed as a summation of the currents at a node 702. Using the reference directions shown in FIG. 7, the current $I_{opa}$ may be expressed as:

$I_{opa} = -(I_{opah}{-1}) + (I_{opah}{0}) - (I_{opah}{+1})$, where $I_{opah}{-1} = z^{\{\ldots 0,-4,-8\ldots\}} * c_{-1} * I_{ip}$, $I_{opah}{0} = z^{\{\ldots -1,-5,-9\ldots\}} * c_{0} * I_{ip}$, and $I_{opah}{+1} = z^{\{\ldots -2,-6,-10\ldots\}} * c_{+1} * I_{ip}$.

The current $I_{opb}$ may be expressed as a summation of the currents at a node 704. Using the reference directions shown in FIG. 7, the current $I_{opb}$ may be expressed as:

$I_{opb} = -(I_{opbh}{-1}) + (I_{opbh}{0}) - (I_{opbh}{+1})$, where $I_{opbh}{-1} = z^{\{\ldots 1,-3,-7\ldots\}} * c_{-1} * I_{ip}$, $I_{opbh}{0} = z^{\{\ldots 0,-4,-8\ldots\}} * c_{0} * I_{ip}$, and $I_{opbh}{+1} = z^{\{\ldots -1,-5,-9\ldots\}} * c_{+1} * I_{ip}$.

The current $I_{opc}$ may be expressed as a summation of the currents at a node 706. Using the reference directions shown in FIG. 7, the current $I_{opc}$ may be expressed as:

$I_{opc} = -(I_{opch}{-1}) + (I_{opch}{0}) - (I_{opch}{+1})$, where $I_{opch}{-1} = z^{\{\ldots 2,-2,-6\ldots\}} * c_{-1} * I_{ip}$, $I_{opch}{0} = z^{\{\ldots 1,-3,-7\ldots\}} * c_{0} * I_{ip}$, and $I_{opch}{+1} = z^{\{\ldots 0,-4,-8\ldots\}} * c_{+1} * I_{ip}$.

The current $I_{opd}$ may be expressed as a summation of the currents at a node 708. Using the reference directions shown in FIG. 7, the current $I_{opd}$ may be expressed as:

$I_{opd} = -(I_{opdh}{-1}) + (I_{opdh}{0}) - (I_{opdh}{+1})$, where $I_{opdh}{-1} = z^{\{\ldots 3,-1,-5\ldots\}} * c_{-1} * I_{ip}$, $I_{opdh}{0} = z^{\{\ldots 2,-2,-6\ldots\}} * c_{0} * I_{ip}$, and $I_{opdh}{+1} = z^{\{\ldots 1,-3,-7\ldots\}} * c_{+1} * I_{ip}$.

Equations similar to those described above for the positive even and odd branches of the FFE architecture associated with the portion 700 may be formulated for the negative even and odd branches of that FFE architecture. Furthermore, while not shown in FIG. 7, the j and k units of the portion 700 may be configured to sink or source current with respect to the nodes 702, 704, 706, and 708 much like what is shown and described above in connection with FIG. 6.

The examples described above are provided in connection with half-rate and quarter-rate versions of FFE architectures. In some embodiments, the principles of operation described herein may be extended or applied with respect to an architecture characterized by a different rate (e.g., one-eighth, one-sixteenth, etc.).

Figure 9:
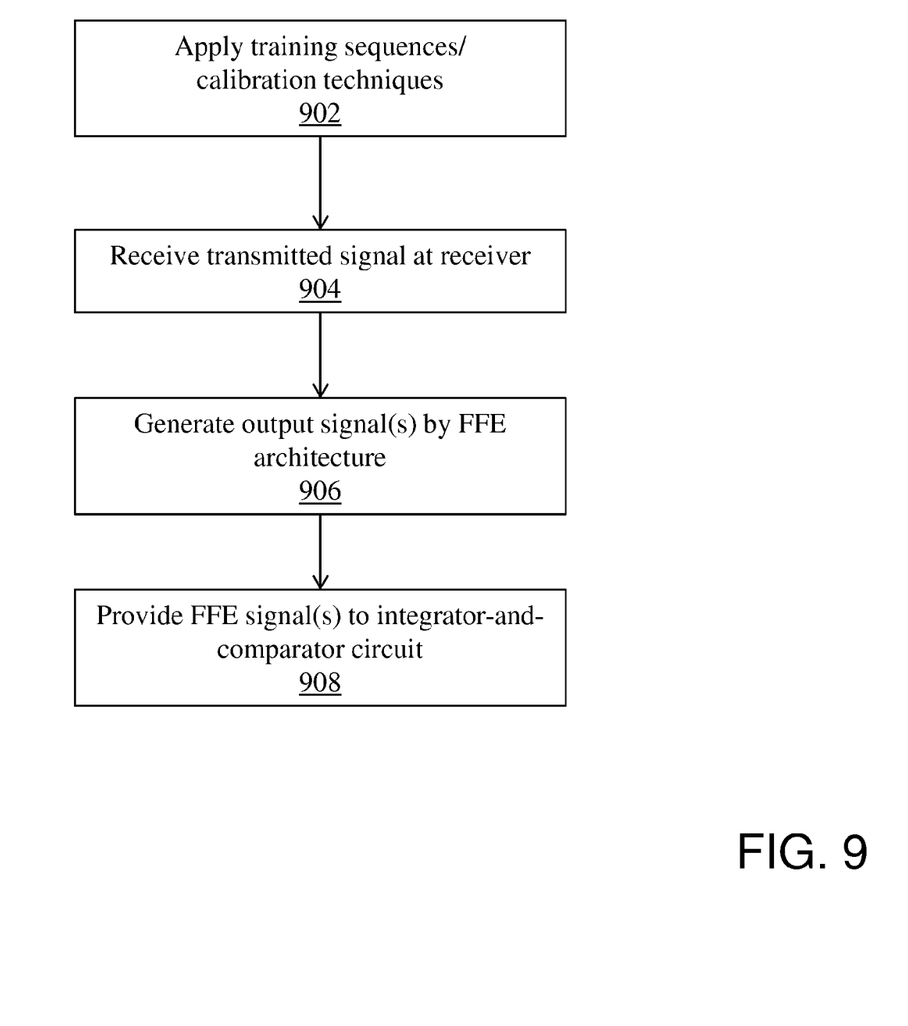
FIG. 9 depicts a flow chart of an exemplary method in accordance with one or more embodiments.

FIG. 9 illustrates a flow chart of a method in accordance with one or more embodiments of this disclosure. The method of FIG. 9 may be executed in connection with one or more devices, components, or systems, such as those described herein. The method of FIG. 9 may be used to implement an FFE architecture, optionally as part of a receiver.

In block 902, one or more training sequences or calibration techniques may be applied with respect to an FFE architecture. The training sequences/calibration techniques may be applied for any number of reasons. For example, the training sequences/calibration techniques may be used to determine signals or values to be applied to the j and k units, where the j and k units may be configured to provide weightings to compensate for effects associated with a communication channel. The training sequences/calibration techniques may be used to configure a variable gain amplifier (e.g., to set a value for the resistor R of the circuit 202 of FIG. 2) to obtain sufficient noise margin with respect to an integrator-and-comparator circuit (e.g., the circuit of FIG. 4) that may follow the FFE architecture.

In some embodiments, the operations associated with the block 902 may be performed once (e.g., at a start). In some embodiments, the operations associated with the block 902 may be performed cyclically or at various points in time in order to re-calibrate the FFE architecture. Such re-calibration may be useful in environments where one or more parameters (e.g., an impedance) associated with the communication channel are subject to change over time or are dynamic in nature.

In block 904, a signal that is transmitted over a communication channel may be received by a receiver. The signal may be conveyed or provided to the FFE architecture, potentially as a differential pair.

In block 906, the FFE architecture may generate one or more output signals based on the received signal of block 904. For example, the FFE architecture may generate one or more pairs of differential currents based on the received signal.

In block 908, the output signal(s) generated by the FFE architecture in block 906 may be provided to an integrator-and-comparator circuit. The integrator-and-comparator circuit may generate an output signal (e.g., a digital output signal) that may be indicative of the received signal, optionally as a function of a specified bit error rate (BER).

Technical effects and benefits of the disclosure include an ability to provide an FFE that is optimized for high speed and low power communications. Such communications may provide data rates on the order of 5-28 gigabits per second (Gbps), with power potentially on the order of 3 milliwatts per gigabit (mW/Gbpss). The data may be conveyed with a BER on the order of $10^{-12}$–$10^{-15}$. In accordance with various aspects of the disclosure, an FFE may be simple to construct, manufacture, or fabricate by minimizing the number of components (e.g., transistors) that are used.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized, such as one or more non-transitory computer readable mediums. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A feed-forward equalization system comprising:
a first circuit configured to receive a signal transmitted over a channel as a differential pair; and
a second circuit configured to mirror the signal as at least a pre-cursor component comprising a first transistor of a first type of technology, a cursor component comprising a second transistor of a second type of technology, and a post-cursor component comprising a third transistor of the first type of technology;
wherein the pre-cursor component comprises a first plurality of transistors of the first type of technology, and wherein the post-cursor component comprises a second plurality of transistors of the first type of technology, and wherein the first plurality of transistors and the second plurality of transistors are controlled by control signals that are selected to compensate for one or more characteristics associated with the channel; and
wherein the first plurality of transistors comprises a first set of transistors configured to source current with respect to the cursor component and a second set of transistors configured to sink current with respect to the cursor component, and wherein the second plurality of transistors comprises a third set of transistors configured to source current with respect to the cursor component and a fourth set of transistors configured to sink current with respect to the cursor component.

2. The system of claim 1, wherein the first type of technology is associated with a p-channel metal oxide semiconductor (PMOS) transistor, and wherein the second type of technology is associated with an n-channel metal oxide semiconductor (NMOS) transistor.

3. The system of claim 1, wherein the first circuit is configured to receive the signal as differential voltage signals.

4. The system of claim 3, wherein the first circuit is configured to convert the differential voltage signals into a pair of differential currents, and wherein the differential currents are configured to bias two diode-connected metal oxide semiconductor (MOS) transistors, and wherein the second circuit is configured to mirror the signal based on sampling and holding voltages associated with the MOS transistors.

5. The system of claim 3, wherein a first portion of the second circuit is associated with a first of the differential voltage signals, and wherein a second portion of the second circuit is associated with a second of the differential voltage signals, and wherein a first sub-portion of the first portion of the second circuit is associated with a first clock signal, and wherein a second sub-portion of the first portion of the second circuit is associated with a second clock signal, and wherein a third sub-portion associated with the second portion of the second circuit is associated with the first clock signal, and wherein a fourth sub-portion associated with the second portion of the second circuit is associated with the second clock signal.

6. The system of claim 5, wherein the first clock is phase shifted one-hundred eighty degrees relative to the second clock, and wherein the system implements a half-rate input/output (I/O) receiver.

7. The system of claim 1, wherein the second circuit is associated with four clock signals, and wherein the system implements a quarter-rate input/output (I/O) receiver.

8. The system of claim 1, further comprising:
a third circuit configured to:
generate an integrated signal by integrating the mirrored signal, and
compare the integrated signal to a reference to generate an output signal indicative of the received signal based on a specified error rate.

9. A method for implementing a feed-forward equalization system for a receiver, comprising:
applying at least one of a training sequence and a calibration technique to a pre-cursor component and a post-cursor component;
selecting values for control signals associated with the pre-cursor component and the post-cursor component based on the at least one of a training sequence and a calibration technique;
receiving, at the receiver, a signal over a channel; and
generating a plurality of output current signals based on the received signal and the control signals,
wherein each of the plurality of output current signals comprises a summation of a first current associated with the pre-cursor component, a second current associated with a cursor component, and a third current associated with the post-cursor component;
wherein the pre-cursor component comprises a first plurality of transistors of a first type of technology, the cursor component comprises a transistor of a second type of technology, and the post-cursor component comprises a second plurality of transistors of the first type of technology, and wherein the first plurality of transistors and the second plurality of transistors are controlled by control signals that are selected to compensate for one or more characteristics associated with the channel; and
wherein the first plurality of transistors comprises a first set of transistors configured to source current with respect to the cursor component and a second set of transistors configured to sink current with respect to the cursor component, and wherein the second plurality of transistors comprises a third set of transistors configured to source current with respect to the cursor component and a fourth set of transistors configured to sink current with respect to the cursor component.

10. The method of claim 9, further comprising:
receiving, at the receiver, the signal as differential voltage signals; and
converting the differential voltage signals into a pair of differential currents.

11. The method of claim 10, further comprising:
generating a first clock signal and a second clock signal;
applying the first clock signal to a first portion of the pre-cursor component, a first portion of the cursor component, and a first portion of the post-cursor component, wherein the first portions are associated with a first of the differential voltage signals;
applying the first clock signal to a second portion of the pre-cursor component, a second portion of the cursor component, and a second portion of the post-cursor component, wherein the second portions are associated with a second of the differential voltage signals;
applying the second clock signal to a third portion of the pre-cursor component, a third portion of the cursor component, and a third portion of the post-cursor component, wherein the third portions are associated with the first of the differential voltage signals; and applying the second clock signal to a fourth portion of the pre-cursor component, a fourth portion of the cursor component, and a fourth portion of the post-cursor component, wherein the fourth portions are associated with the second of the differential voltage signals.

12. The method of claim 11, wherein the first clock signal is a shifted version of the second clock signal, the method further comprising:
sampling the first, second, and third currents based on edges in the first and second clock signals.

13. The method of claim 9, wherein the first type of technology is associated with a p-channel metal oxide semiconductor (PMOS) transistor, and wherein the second type of technology is associated with an n-channel metal oxide semiconductor (NMOS) transistor.

14. An apparatus comprising:
a first circuit configured to receive a pair of differential voltage signals and convert the differential voltage signals into a pair of differential current signals;
a second circuit configured to be biased based on the differential current signals; and
a third circuit configured to sample and hold a voltage associated with the second circuit to convey a weighted copy of the differential current signals to transistor outputs that implement a pre-cursor component, a cursor component, and a post-cursor component;
wherein the pre-cursor component comprises a first plurality of transistors of a first type of technology, the cursor component comprises a transistor of a second type of technology, and the post-cursor component comprises a second plurality of transistors of the first type of technology, and wherein the first plurality of transistors and the second plurality of transistors are controlled by control signals that are selected to compensate for one or more characteristics associated with the channel; and
wherein the first plurality of transistors comprises a first set of transistors configured to source current with respect to the cursor component and a second set of transistors configured to sink current with respect to the cursor component, and wherein the second plurality of transistors comprises a third set of transistors configured to source current with respect to the cursor component and a fourth set of transistors configured to sink current with respect to the cursor component.

15. The apparatus of claim 14, wherein the weighted copy of the differential current signals is based on a summation of currents, and wherein the summation of currents is based on control signals applied to the pre-cursor component and the post-cursor component, and wherein the control signals are selected to compensate for at least one condition associated with a communication channel.

16. The apparatus of claim 14, wherein the at least one condition associated with the communication channel comprises at least one of an impedance, a dielectric loss, attenuation, and dispersion, and wherein the control signals are determined based on at least one of a training sequence and a calibration technique, and wherein the transistor outputs are associated with transistors that are coupled to power rails.

17. The apparatus of claim 14, wherein the pre-cursor component and post-cursor component are implemented as p-channel metal oxide semiconductor (PMOS) transistors, and wherein the cursor component is implemented as at least one n-channel metal oxide semiconductor (NMOS) transistor.

* * * * *